(12) United States Patent
Park et al.

(10) Patent No.: US 9,257,714 B2
(45) Date of Patent: Feb. 9, 2016

(54) ORGANIC ELECTROLYTE SOLUTION AND REDOX FLOW BATTERY INCLUDING THE SAME

(71) Applicant: Samsung Electronics Co., Ltd., Suwon-si, Gyeonggi-do (KR)

(72) Inventors: Joung-won Park, Seongnam-si (KR); Duk-jin Oh, Seoul (KR); Doo-yeon Lee, Yongin-si (KR); Myung-jin Lee, Seoul (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 287 days.

(21) Appl. No.: 13/754,415

(22) Filed: Jan. 30, 2013

(65) Prior Publication Data
US 2013/0196206 A1 Aug. 1, 2013

(30) Foreign Application Priority Data

Jan. 31, 2012 (KR) .................. 10-2012-0009742

(51) Int. Cl.
| | | |
|---|---|---|
| *H01M 6/04* | (2006.01) | |
| *H01M 2/38* | (2006.01) | |
| *H01M 4/36* | (2006.01) | |
| *H01M 6/16* | (2006.01) | |
| *H01M 8/20* | (2006.01) | |
| *H01M 10/0564* | (2010.01) | |
| *H01M 8/18* | (2006.01) | |

(52) U.S. Cl.
CPC ............... *H01M 8/20* (2013.01); *H01M 8/188* (2013.01); *H01M 10/0564* (2013.01); *H01M 2300/0025* (2013.01); *Y02E 60/528* (2013.01)

(58) Field of Classification Search
None
See application file for complete search history.

(56) References Cited

U.S. PATENT DOCUMENTS

| 6,280,883 B1 | 8/2001 | Lamanna et al. |
|---|---|---|
| 2010/0129716 A1 | 5/2010 | Kato et al. |
| 2011/0151317 A1 | 6/2011 | Giroud et al. |
| 2011/0195283 A1 * | 8/2011 | Sun et al. ................. 429/80 |

FOREIGN PATENT DOCUMENTS

| JP | 60-257076 A | 12/1985 |
|---|---|---|
| JP | 1996-064223 A | 3/1996 |
| JP | 2010-086935 A | 4/2010 |

OTHER PUBLICATIONS

Product information sheet for sodium carboxymethyl cellulose, Sigma-Aldrich, available online at www.Sigma-Aldrich.com, p. 1-4.*

* cited by examiner

*Primary Examiner* — Susannah Chung
*Assistant Examiner* — Robert T Butcher
(74) *Attorney, Agent, or Firm* — Cantor Colburn LLP

(57) ABSTRACT

An organic electrolyte solution including a solvent; an electrolyte including a metal-ligand coordination compound; and an additive including a hydrophobic group and a metal affinic group.

20 Claims, 5 Drawing Sheets

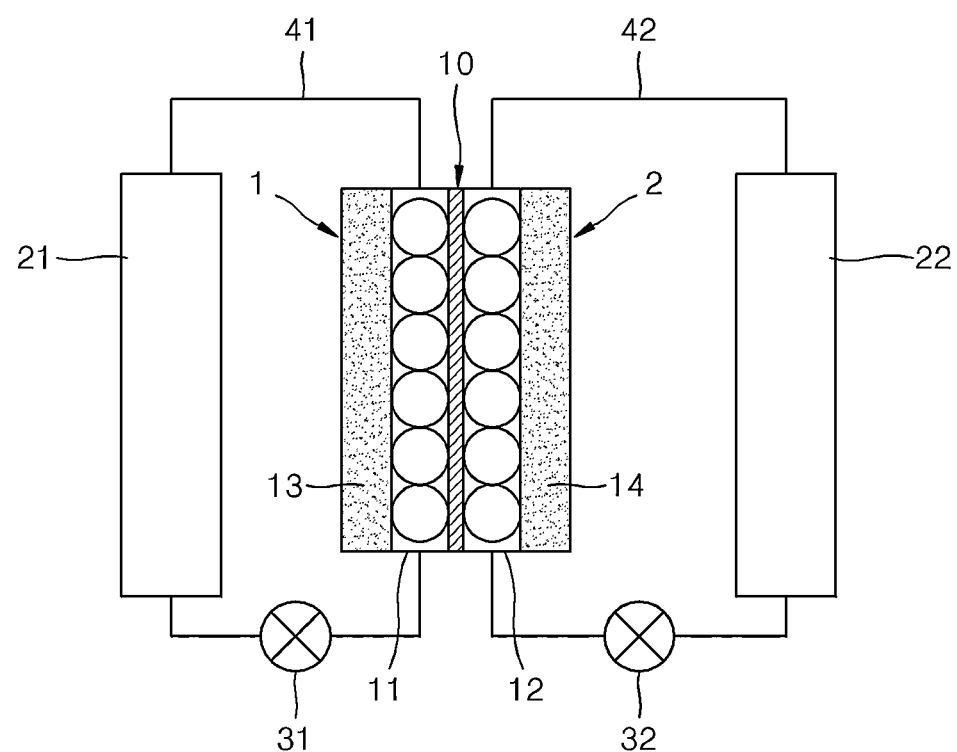

ORGANIC ELECTROLYTE SOLUTION AND REDOX FLOW BATTERY INCLUDING THE SAME

This application claims priority to and the benefit of Korean Patent Application No. 10-2012-0009742, filed on Jan. 31, 2012, and all the benefits accruing therefrom under 35 U.S.C. §119, the content of which is incorporated herein in its entirety by reference.

BACKGROUND

1. Field

The present disclosure relates to an organic electrolyte solution and a redox flow battery including the same, and more particularly, to an organic electrolyte solution for a battery having high energy density, and a redox flow battery including the same.

2. Description of the Related Art

Secondary batteries are highly efficient energy storage systems which are widely used for mobile phones and large power storage devices. Specifically, secondary batteries are used in semiconductor and liquid crystal devices, acoustic devices, and information and communication devices such as mobile phones and laptop computers. More recently, secondary batteries are being used as power sources in hybrid vehicles.

Power storage systems for portable electronics and hybrid vehicles desirably provide a stable energy supply and high energy conversion efficiency. Recently, redox flow batteries are being considered to provide a secondary battery having larger capacity and improved durability, such as a capacity and durability suitable for grid power storage systems.

Unlike other batteries, an active material of the redox flow battery is in a liquid state instead of a solid state, and the redox flow batteries use a mechanism of storing and generating electric energy according to an oxidation/reduction reaction of catholyte and anolyte ions at a cathode and an anode, respectively.

In other words, the redox flow batteries include an electrolyte solution, wherein an active material of an electrode is dissolved in a solvent. The catholyte is oxidized and the anolyte is reduced when the redox flow battery including the catholyte and the anolyte, which have different oxidation states, is charged, and the electromotive force of the redox flow battery is determined by a difference between standard electrode potentials)($E^0$) of a redox couple of the catholyte and the anolyte. The catholyte and anolyte are supplied from respective electrolyte solution tanks by a pump. Oxidation and reduction of the electrolytes occurs simultaneously on the surfaces of the cathodes and anodes in the redox flow battery, similar to other types of batteries. Also, because the electrolyte solution tanks may be easily scaled, redox flow batteries may have power characteristics like fuel cells.

However, since the solubility of the catholyte and/or the anolyte of a redox flow battery may be insufficient, it can be difficult to obtain a redox flow battery having a desired energy density. Thus there remains a need for an improved electrolyte for a redox flow battery.

SUMMARY

Provided is an organic electrolyte solution for a redox flow battery having an improved energy density by increasing the solubility of an electrolyte in an organic electrolyte solution.

Provided is a redox flow battery including the organic electrolyte solutions.

Additional aspects will be set forth in part in the description which follows and, in part, will be apparent from the description.

According to an aspect, an organic electrolyte solution includes a solvent; an electrolyte including a metal-ligand coordination compound; and a high-molecular weight additive including a metal affinic group.

The metal may include at least one selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

The ligand may include at least one selected from dipyridyl, terpyridyl, ethylene diamine, propylene diamine, phenanthroline, and a N-heterocyclic carbene (NHC).

The metal-ligand coordination compound may be reversibly oxidizable or reducible in an oxidation-reduction reaction.

Also disclosed is an electrode for a redox flow battery including the organic electrolyte solution.

Also disclosed is a tank including the organic electrolyte solution.

According to another aspect, a redox flow battery includes a cathode cell including a cathode and a catholyte; an anode cell including an anode and an anolyte; and an ion exchange membrane disposed between the cathode cell and the anode cell, wherein at least one of the catholyte and the anolyte includes the organic electrolyte solution.

Also disclosed is method of manufacturing an organic electrolyte solution for a redox flow battery, the method including: contacting a solvent, an electrolyte including a metal-ligand coordination compound; and a high-molecular weight additive including a metal affinic group to manufacture the organic electrolyte solution.

BRIEF DESCRIPTION OF THE DRAWINGS

These and/or other aspects will become apparent and more readily appreciated from the following description of the embodiments, taken in conjunction with the accompanying drawings in which:

FIG. 2 is a schematic diagram of an embodiment of a redox flow battery;

DETAILED DESCRIPTION

Figure 1:
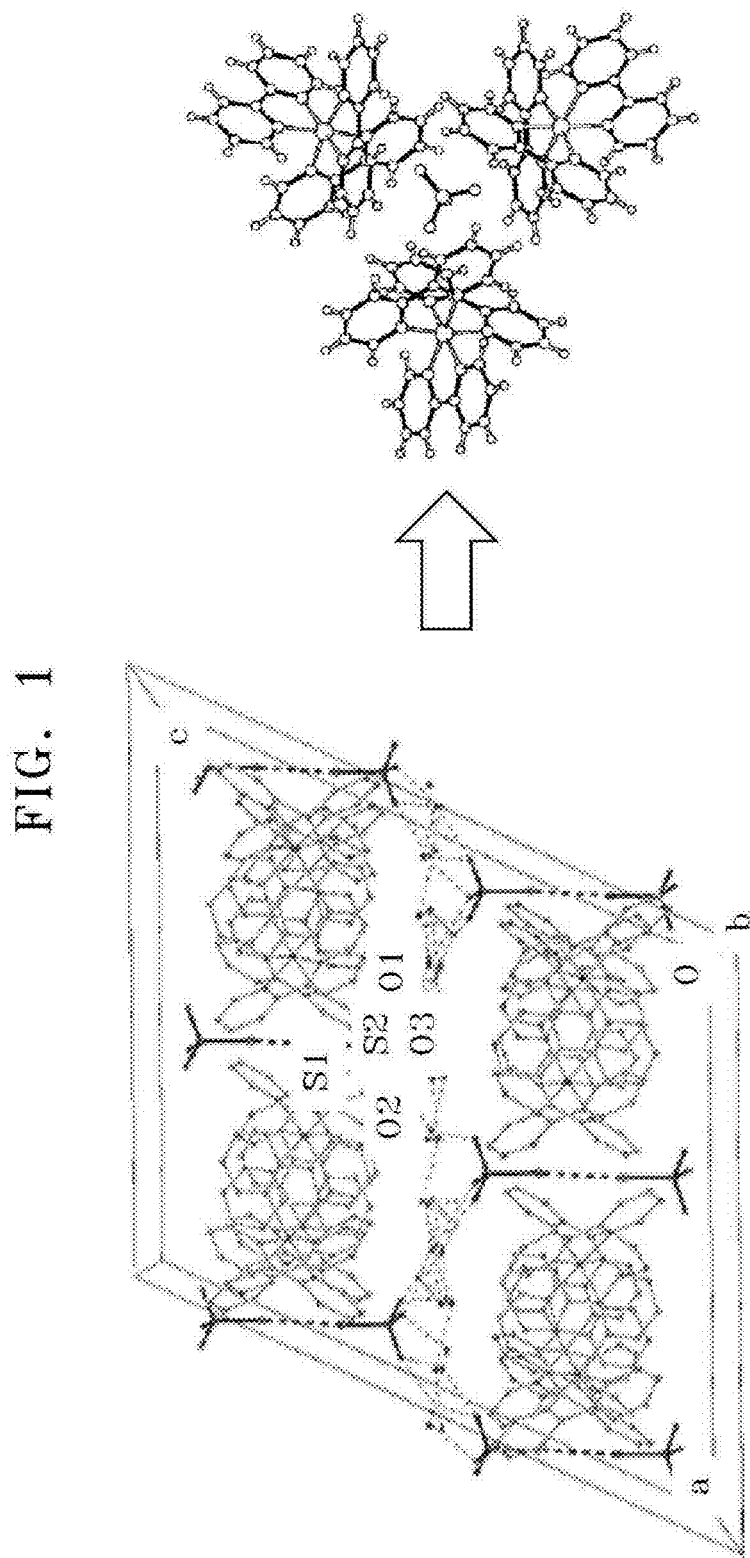
FIG. 1 shows an embodiment of a mechanism of action of an additive of an organic electrolyte solution.

Reference will now be made in detail to embodiments, examples of which are illustrated in the accompanying drawings. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers, and/or sections, these elements, components, regions, layers, and/or sections should not be limited by these terms. These terms are only used to distinguish one element, component, region, layer, or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

"Alkyl" means a straight or branched chain, saturated, monovalent hydrocarbon group (e.g., methyl or hexyl).

"Aryl," means a cyclic moiety in which all ring members are carbon and at least one ring is aromatic, the moiety having the specified number of carbon atoms, specifically 6 to 24 carbon atoms, more specifically 6 to 12 carbon atoms. More than one ring may be present, and any additional rings may be independently aromatic, saturated or partially unsaturated, and may be fused, pendant, spirocyclic or a combination thereof.

"Substituted" means that the compound or group is substituted with at least one (e.g., 1, 2, 3, or 4) substituent independently selected from a hydroxyl (—OH), a C1-9 alkoxy, a C1-9 haloalkoxy, an oxo (=O), a nitro (—NO$_2$), a cyano (—CN), an amino (—NH$_2$), an azido (—N$_3$), an amidino (—C(=NH)NH$_2$), a hydrazino (—NHNH$_2$), a hydrazono (—C(=NNH$_2$)—), a carbonyl (—C(=O)—), a carbamoyl group (—C(O)NH$_2$), a sulfonyl (—S(=O)$_2$—), a thiol (—SH), a thiocyano (—SCN), a tosyl (CH$_3$C$_6$H$_4$SO$_2$—), a carboxylic acid (—C(=O)OH), a carboxylic C1 to C6 alkyl ester (—C(=O)OR wherein R is a C1 to C6 alkyl group), a carboxylic acid salt (—C(=O)OM) wherein M is an organic or inorganic anion, a sulfonic acid (—SO$_3$H$_2$), a sulfonic mono- or dibasic salt (—SO$_3$MH or —SO$_3$M$_2$ wherein M is an organic or inorganic anion), a phosphoric acid (—PO$_3$H$_2$), a phosphoric acid mono- or dibasic salt (—PO$_3$MH or —PO$_3$M$_2$ wherein M is an organic or inorganic anion), a C1 to C12 alkyl, a C3 to C12 cycloalkyl, a C2 to C12 alkenyl, a C5 to C12 cycloalkenyl, a C2 to C12 alkynyl, a C6 to C12 aryl, a C7 to C13 arylalkylene, a C4 to C12 heterocycloalkyl, and a C3 to C12 heteroaryl instead of hydrogen, provided that the substituted atom's normal valence is not exceeded.

An organic electrolyte solution according to an embodiment includes a solvent; an electrolyte including a metal-ligand coordination compound; and a high-molecular weight additive comprising a metal affinic group, in particular a high-molecular weight additive comprising a hydrophobic backbone and a metal affinic group. The additive may comprise a hydrophobic group. The additive may be a compound optionally containing less than 10 repeating units, or a polymer containing at least 10 repeating units, which includes oligomers. The polymer may have a backbone with the metal affinic group(s) pendant from the backbone. The additive may be at least one selected from an ionic, a non-ionic, or an amphoteric compound.

As stated above, the high-molecular weight additive may comprise a hydrophobic group, and may be a polymer, and the backbone of the high-molecular weight additive having the metal affinic group may be hydrophobic. While not wanting to be bound by theory, it is understood that because of the hydrophobic group or backbone, a π-π interaction and a hydrophobic interaction occurs between the additive, for example the high-molecular weight additive, and the ligand of the electrolyte, which includes the metal-ligand coordination compound. Also, it is understood that a dipole-dipole interaction and a hydrogen bonding interaction occurs between the metal affinic group and the solvent, thereby increasing the solubility of the electrolyte in a solvent. That is, as shown in FIG. 1, the metal-ligand coordination compounds of the electrolyte may form a complex in a solvent due to attraction between the metal-ligand coordination compounds, and thus the solubility of the metal-ligand coordination compound may be reduced. However, and while not wanting to be bound by theory, when the additive, for example the high-molecular weight additive comprising the metal affinic group is added to an electrolyte, the additive such as the high-molecular weight additive may coordinate with or be intercalated into the metal-ligand coordination compound such that the metal affinic group interacts with the metal of the metal-ligand coordination compound and the hydrophobic group or backbone interacts with the ligand of the metal-ligand coordination compound. Thus, the additive such as the high-molecular weight additive may uniformly disperse the metal-ligand coordination compound in the solvent, thereby increasing the solubility of the metal-ligand coordination compound in the solvent.

As stated above, the additive comprising a hydrophobic group and a metal affinic group can be a compound optionally containing less than 10 repeating units. The hydrophobic group may include a substituted or unsubstituted $C_6$ to $C_7$ aryl group, and a substituted or unsubstituted $C_6$ to $C_{40}$ alkyl group, cycloalkyl group, alkenyl group, cycloalkenyl group, alkynyl group, or cycloalkynyl group, for example a straight or branched chain $C_6$ to $C_{32}$ alkyl group. The optional repeating units may be any repeating units, for example, $C_1$ to $C_3$ alkyleneoxy groups such as ethyleneoxy groups.

The high-molecular weight additive comprising the metal affinic group may include, as a backbone, at least 10 repeating units, and may be, for example, a saturated or unsaturated hydrocarbon, a polyester, a polyurethane, a phosphoric ester polymer, or a phosphoric ester-sulfonic acid amine copolymer, for example. The high-molecular weight additive may have a weight average molecular weight of about 2,000 to about 500,000 Daltons (Da), about 10,000 to about 100,000 Da, specifically about 15,000 to about 90,000 Da, more specifically about 20,000 to about 80,000 Da. The high-molecular weight additive comprising the metal affinic group may be a homopolymer, a block copolymer, a graft copolymer, or a random copolymer. The additive may be at least one selected an alkylolammonium salt of an acidic copolymer having a weight average molecular weight of about 5,000 to about 500,000 Daltons (Da), about 10,000 to about 100,000 Da, specifically about 15,000 to about 90,000 Da, more specifically about 20,000 to about 80,000 Da.

In the high-molecular weight additive comprising the metal affinic group, a hydrogen atom of the backbone may be substituted with a hydrophobic group. Thus, the high-molecular weight additive comprising the metal affinic group may further include a hydrophobic group in the backbone or attached to the backbone of the oligomer or polymer. The hydrophobic group may comprise from 1 to 24 carbon atoms, specifically about 2 to 20 carbon atoms, more specifically about 8 to 12 carbon atoms. The hydrophobic group may be saturated or unsaturated, linear, branched, or cyclic, and aliphatic or aromatic. The hydrophobic group may further comprise at least one functional group selected from an ether, amide, carbonate, urethane, carbamate, and a xanthate group. Examples of the hydrophobic group may include a substituted or unsubstituted $C_6$ to $C_7$ aryl group, and a substituted or unsubstituted $C_1$ to $C_3$ alkyl group.

The metal affinic group of the additive, in particular the high-molecular weight additive comprising the metal affinic group may be at least one selected from an ester group, a carboxyl group, a phosphoric acid group, a sulfonic acid group, a hydroxyl group, and an amine group.

The high-molecular weight additive comprising the metal affinic group may be a commercially available product or may be prepared through a reaction between a high-molecular weight additive precursor, e.g., a polymer, having a molecular weight as described above, and at least one selected from an alkylammonium salt, carboxylic acid, sulfonic acid, alcohol, alcohol, acrylic acid, and a phosphoric acid, and a derivative thereof.

In an embodiment, the additive may comprise at least one selected from an alkylolammonium salt of a copolymer having acid groups, for example CAS No. 162627-23-8 (polyphosphoric acids, esters with 2-oxepanone-polyethylene glycol mono-methyl ether-tetrahydro-2H-pyran-2-one reaction product, compounds with 2-(dibutylamino)ethanol); an alkylammonium salt of a phosphoric acid ester of a copolymer; a copolymer containing phosphoric acid groups; a copolymer containing carboxylic acid groups; a polyester containing phosphoric acid groups; a poly(oxy(C1-C3)alkylene (C6-C32 alkyl ether, for example CAS No. 9002-92-0 (poly(oxyethylene)(4) lauryl ether); and the like.

An additive, including a high-molecular weight compound comprising the metal affinic group and which is commercially available may be at least one selected from DISPERBYK®-180, DISPERBYK®-145, DISPERBYK®-2163, and DISPERBYK®-110 (each available from BYK-Chemie GmbH, Wesel, Germany).

The amount of the additive in the organic electrolyte solution may about 1 to about 15 volume percent (volume %), specifically about 2 to about 10 volume %, for example, about 3 to about 5 volume %, based on a total volume of the organic electrolyte solution. When the amount of the additive is within the foregoing range, the electrical properties of the organic electrolyte solution may not be adversely affected and the solubility of the electrolyte may be remarkably increased.

The metal-ligand coordination compound has suitable stability, may be dissolved in an electrolyte solution without being oxidized, and may be dissolved in a non-aqueous solvent without precipitating or otherwise being removed from solution.

A redox flow battery may be discharged by connecting it to an external circuit including an electrical load and supplying a current to the external circuit. Also, the redox flow battery may be charged by connecting it to an external power source and supplying a current to the redox flow battery.

Generally, a catholyte is charged when a redox couple is oxidized to a higher of two oxidation states, and is discharged when reduced to a lower of the two oxidation states. In contrast, an anolyte is charged when a redox couple is reduced to a lower of two oxidation states, and is discharged when oxidized to a higher one of the two oxidation states, as shown in Scheme 1.

Scheme 1

Cathode
$C^n \rightarrow C^{n+y} + ye^-$ (Charge)
$C^{n+y} + ye^- \rightarrow C^n$ (Discharge)
(C: Catholyte)

Anode
$A^{n+x} + xe^- \rightarrow A^n$ (Charge)
$A^n \rightarrow A^{n+x} + xe^-$ (Discharge)
(A: Anolyte)

Since a working potential of a redox flow battery using an aqueous solvent is limited by a potential of water decomposition, an aqueous redox flow battery has a low operating voltage, limiting its energy density. Accordingly, a non-aqueous solvent may be used. However, available electrolytes have insufficient solubility in the non-aqueous solvent, and the solubility may be further reduced when a metal ion of the electrolyte is reduced. Thus, a desired energy density may not be obtained, and a cell life may be decreased since a charge and discharge irreversible capacity may accumulate as the number of cycles is increased.

Accordingly, the above-described problems may be overcome by increasing the solubility of the metal-ligand coordination compound in a non-aqueous, e.g., organic, electrolyte.

A metal which is stable in the electrolyte solution, and is sufficiently stable to oxidation, may be at least one selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V). In particular, the metal may be Ni.

A ligand in the metal-ligand coordination compound may be any suitable aromatic ligand or aliphatic ligand. According to an embodiment, the ligand may be at least one selected from dipyridyl, terpyridyl, ethylene diamine, propylene diamine, phenanthroline, and a N-heterocyclic carbene (NHC). Examples of the NHC ligand may include 2,6-bis(methyl imidazole-2-ylidene)pyridine, 1,3-dimethylimidazole, 1,3-bis(2,5-diisopropyl)imidazole, 1,3-dimethylimidazole, 1,3-di-tert-butylimidazole, 1,3-dicyclohexylimidazole, or 1-ethyl3-methylimidazole. The oxidation and reduction of the metal-ligand coordination compound may be reversible in an oxidation-reduction reaction.

The metal-ligand coordination compound may include at least one selected from:

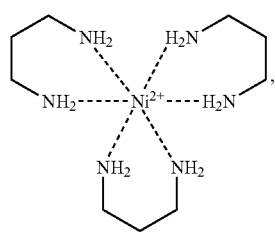

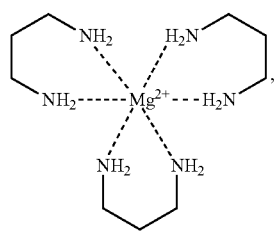

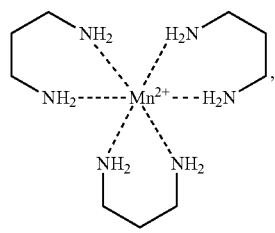

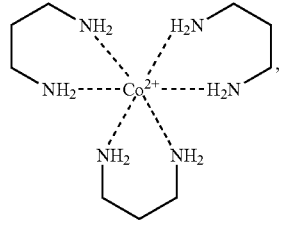

-continued

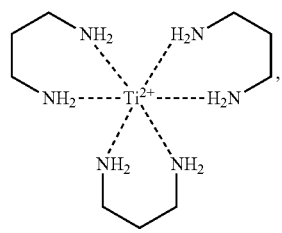

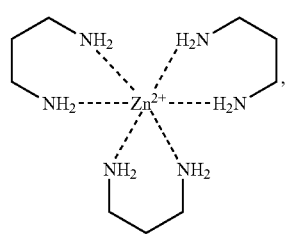

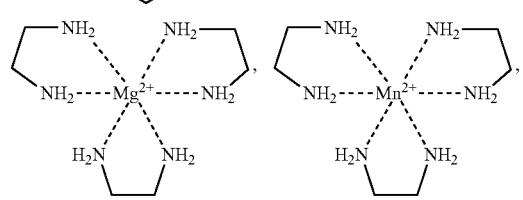

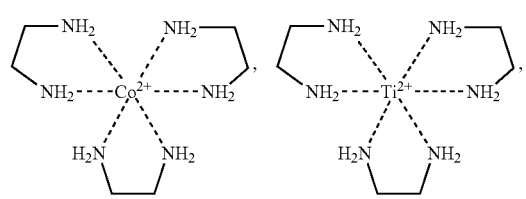

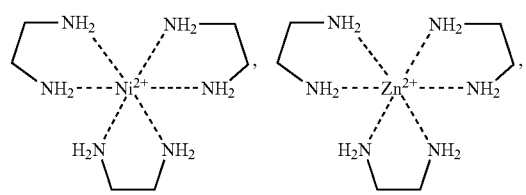

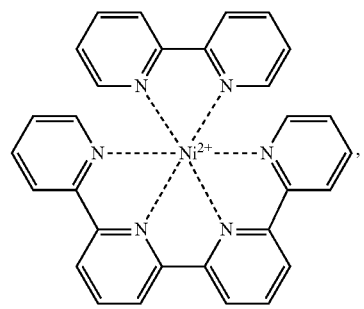

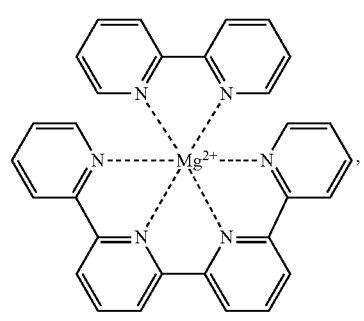

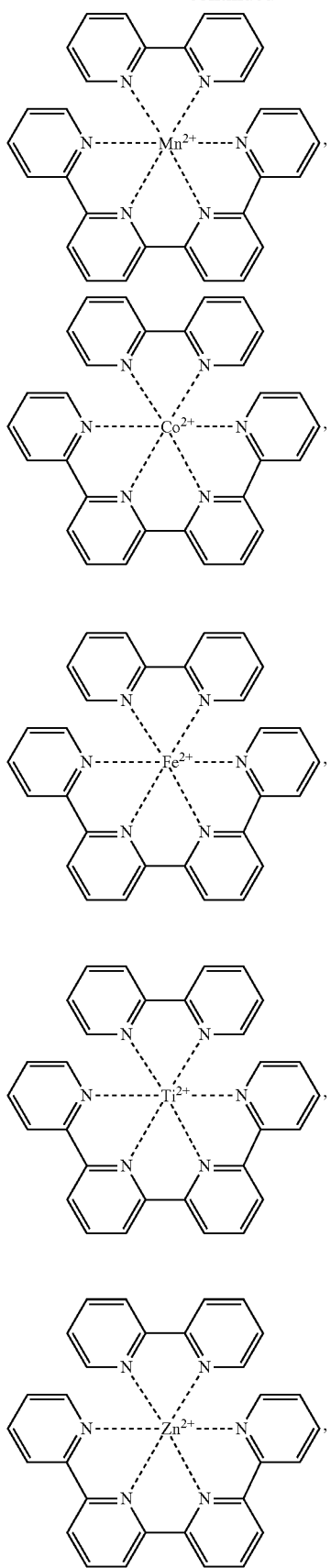
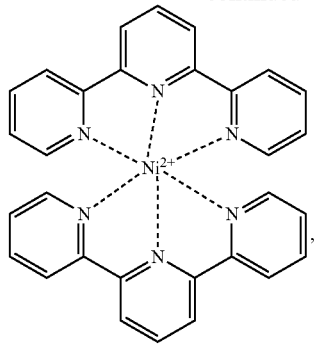
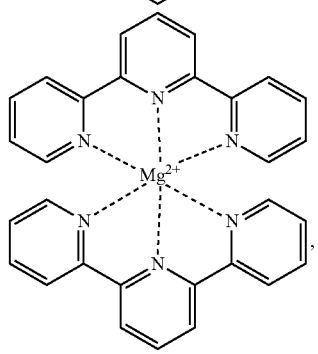
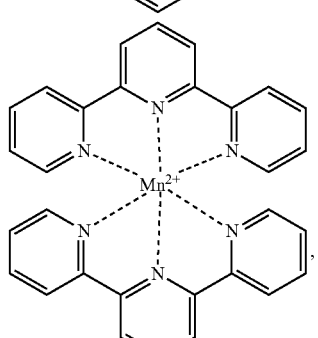
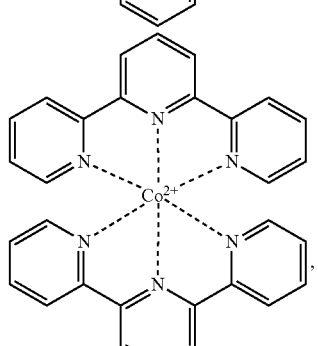
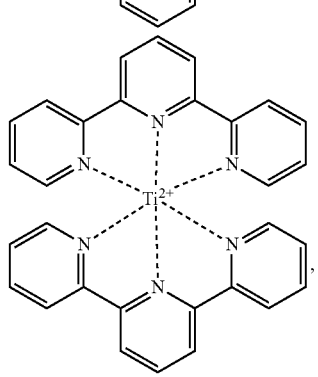

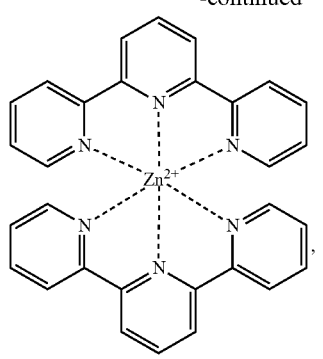
,
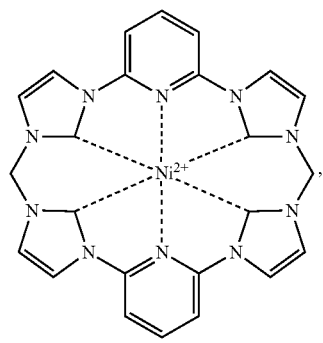
,
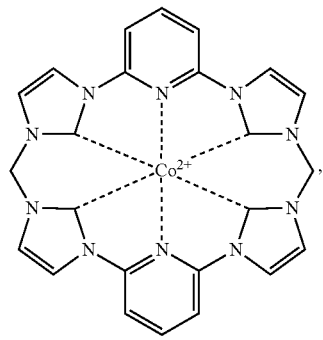
,
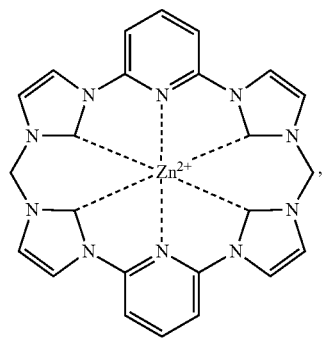
,
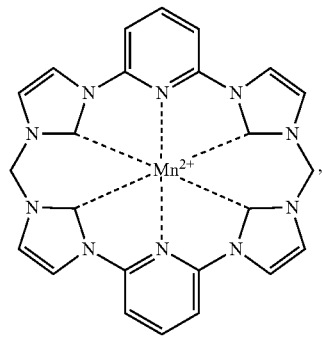
,
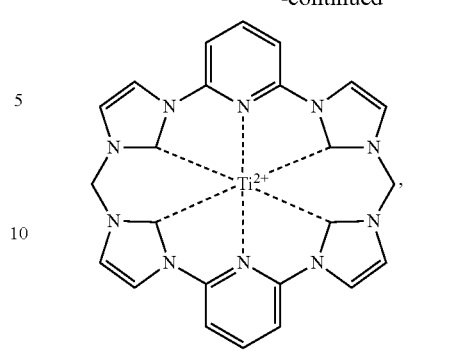
,
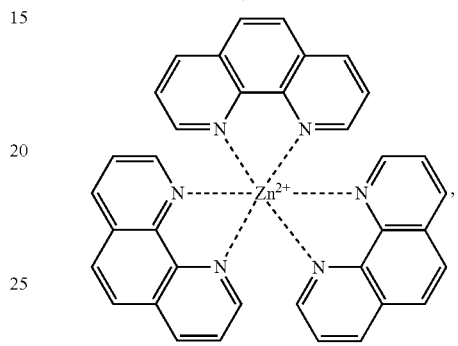
,
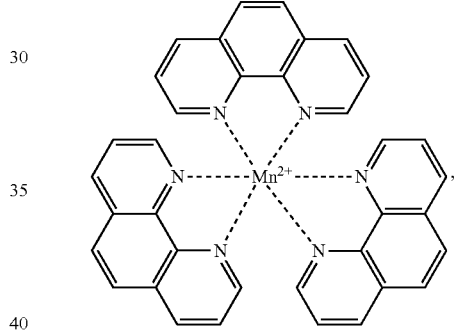
,
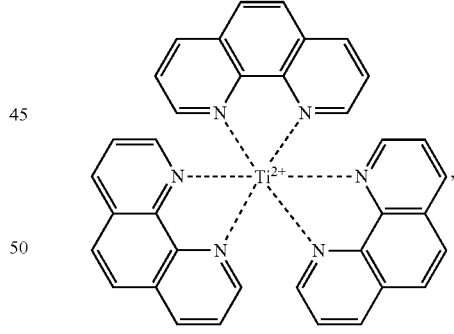
,
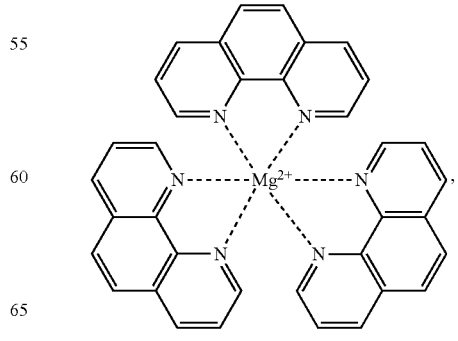
, -continued

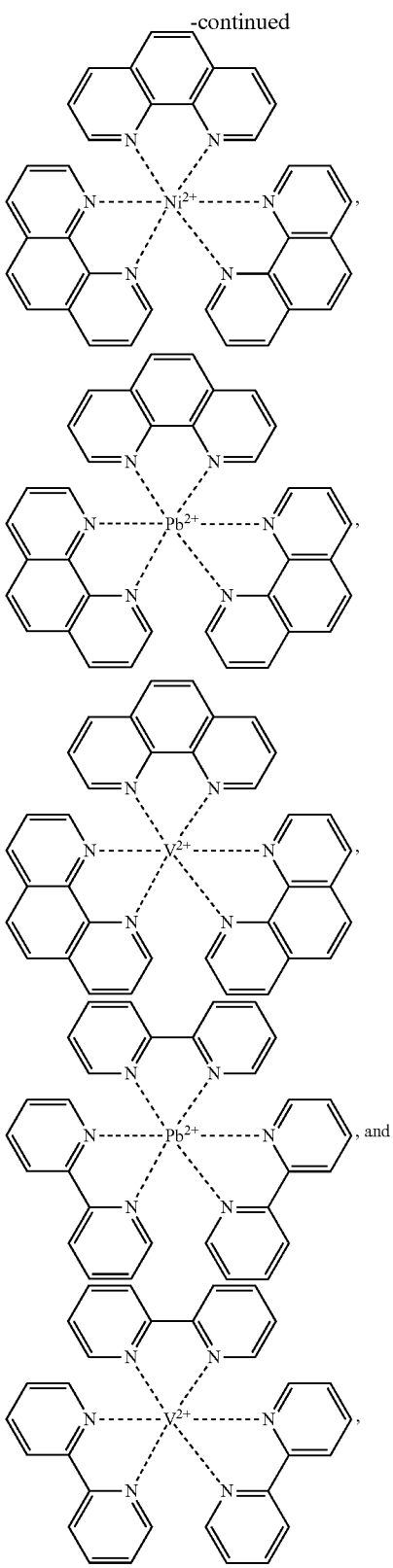

for example.

Examples of the metal-ligand coordination compound may include at least one selected from Ni-phenanthroline, Ni-bipyridine, and Ni-[2,6-bis(methylimidazol-2-ylmethyl)pyridine.

The metal-ligand coordination compound may be included in a concentration of about 0.1 molar (M) to about 3 M, specifically about 0.5 M to about 2 M, more specifically about 1 M in an organic electrolyte solution. When the concentration of the metal-ligand coordination compound is within this range, the storage properties of a battery may be improved.

A counter anion of the metal-ligand coordination compound may be at least one selected from $BF_4^-$, $PF_6^-$, $CF_3SO_3^-$, $ClO_4^-$, $(CF_3SO_2)_3C^-$ and $(CF_3SO_2)_2N^-$, for example.

The solvent may include at least one selected from an aqueous solvent, a non-aqueous solvent, and an ionic liquid.

The aqueous solvent may include at least one selected from sulfuric acid, hydrochloric acid, phosphoric acid, and methane sulfonic acid.

The non-aqueous solvent may include a carbonate, ester, ether, nitrile, sulfone, or lactone. The non-aqueous solvent may include at least one selected from dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, 1,2-dimethoxyethane (DME), 1,2-diethoxyethane, tetrahydrofuran, 2-methyltetrahydrofuran, dioxane, 1,3-dioxolane, diethylene glycol dimethyl ether, ethylene glycol dimethyl ether, and N,N-dimethylacetamide, ethyl methyl carbonate.

The ionic liquid may include at least one selected from an imidazolium, a tetrafluoroborate, a hexafluorophosphate, and an imide. The ionic liquid may include at least one selected from 1-butyl-3-methylimidazolium tetrafluoroborate ($IMIBF_4$), 1-butyl-3-methylimidazolium hexafluorophosphate ($IMIPF_6$), 1-butyl-4-methylpyridinium tetrafluoroborate ($PyBF_4$), N-methyl-N-propylpiperidinium bis(trifluoromethane sulfonyl)imide (PP13-TFSI), and 1-ethyl-3-methylimidazolium tetrafluoroborate ($EMIBF_4$).

A redox flow battery according to an embodiment includes a cathode cell including a cathode and a catholyte; an anode cell including an anode and an anolyte; and an ion exchange membrane disposed between the cathode cell and the anode cell, wherein at least one of the catholyte and the anolyte comprises the organic electrolyte solution described above. In an embodiment at least one of the catholyte and the anolyte consists of the organic electrolyte solution.

FIG. 2 is a diagram schematically illustrating a redox flow battery according to an embodiment.

Referring to FIG. 2, the redox flow battery includes a cathode cell 1 and an anode cell 2, which are separated by an ion exchange membrane 10. The cathode cell 1 and the anode cell 2 respectively include a cathode 13 and an anode 14. The cathode cell 1 is fluidly connected to a cathode tank 21 for providing and discharging a catholyte 11 through a pipe 41. Similarly, the anode cell 2 is fluidly connected to an anode tank 22 for supplying and discharging an anolyte 12 through a pipe 42. The catholyte and anolyte 11 and 12 respectively circulate through pumps 31 and 32, and charging and discharging occur in the cathode 13 and the anode 14 in which the oxidation states of the catholyte and anolyte are changed.

The ion exchange membrane 10 prevents ions of the active materials of the catholyte 11 and the anolyte 12 from contacting each other, and permits transfer of only ions of a charge carrier of a supporting electrolyte.

According to an embodiment, one of the catholyte and the anolyte may be the organic electrolyte solution which includes a solvent; an electrolyte comprising a metal-ligand coordination compound; and an additive comprising a metal affinic group. That is, when one of the catholyte and the anolyte includes an organic electrolyte solution including the additive comprising the metal affinic group, the other of the catholyte and anolyte, i.e., a counter catholyte or a counter anolyte, may be an available electrolyte solution.

At least one of the catholyte and the anolyte may include the metal-ligand coordination compound, which provides reversible oxidation-reduction properties.

The catholyte/anolyte may include a redox couple of $Fe^{2+}$/$Ni^0$ or $Ru^{2+}$/$Ni^0$, for example.

The redox flow battery may further include a catholyte tank and an anolyte tank connected to the cathode cell and the anode cell, respectively, to provide the catholyte and anolyte, respectively.

The ion exchange membrane may be any suitable ion exchange membrane suitable for a redox flow battery. A cation exchange membrane may be at least one selected from a cation exchange membrane obtained by sulfonating a styrene-divinylbenzene copolymer, a cation exchange membrane comprising a sulfonic acid group derived from a copolymer of tetrafluoroethylene and perfluoro sulfonylethoxyvinylether, a cation exchange membrane comprising a copolymer of tetrafluoroethylene and a perfluorovinylether having a carboxyl group at a side chain thereof, and a cation exchange membrane comprising a sulfonic acid group and derived from an aromatic polysulfone copolymer.

The redox flow battery may be suitable for a mobile phone, a portable computer, and an electric vehicle. The redox flow battery may provide high capacity and large output, and may be used in a hybrid vehicle by being connected to an internal combustion engine, a fuel cell, or a super capacitor, for example. In addition, the redox flow battery may be used for other devices that require a large output and high voltage. The present disclosure will be described in greater detail with reference to the following examples. The following examples are for illustrative purposes only and shall not limit the scope of the disclosure.

Preparation Example 1: $Fe^{2+}$—$(bpy)_3$ $[BF_4]_2$ 15.24 grams (g) (29.88 millimoles (mmol)) of Fe$(BF_4)_2 \cdot 6H_2O$ and 50 milliliters (mL) of ethanol were put into a 100 mL round-bottom flask, and were stirred for 20 minutes until a solution was obtained.

14 g (89.64 mmol) of bipyridine and 80 mL of ethanol were put into another 100 mL round-bottom flask, and were stirred for 10 minutes until a solution was obtained.

The bipyridine solution was slowly added to the Fe$(BF_4)_2 \cdot 6H_2O$ solution and then was stirred for three hours at room temperature until the color of a mixed solution changed to red. The resulting product was filtered, washed with 150 mL of water and ethanol three times, dried in air, and then dried in a vacuum oven so as to obtain a pink solid of 16.632 g (yield 79.7%).

Preparation Example 2: $Ni^{2+}$—$(bpy)_3$ $[BF_4]_2$ 7.99 g (23.48 mmol) of Ni$(BF_4)_2 \cdot 6H_2O$ and 50 mL of ethanol were put in a 100 mL round-bottom flask, and were stirred for 20 minutes until a solution state was obtained. 11 g (70.43 mmol) of bipyridine and 90 mL of ethanol were put in another 100 mL round-bottom flask, and were stirred for 10 minutes until a solution state was obtained.

The bipyridine solution was slowly added to the Ni$(BF_4)_2 \cdot 6H_2O$ solution and then was stirred for 2.5 hours at room temperature until the color of a mixed solution changed from green to pink. The resulting product was filtered, washed with 150 mL of water and ethanol three times, dried in air, and then dried in a vacuum oven so as to obtain a pink solid of 15.09 g (yield 91.7%).

Example 1

5 mL of an alkylammonium salt of a phosphoric ester polymer (DISPERBYK®180 available from BYK-Chemie GmbH) was mixed with 95 mL of propylene carbonate (PC) solvent. 0.05 molar (M) of tetraethyl ammonium tetrafluoroborate (TEABF$_4$) and Fe(bpy)$_3$(BF$_4$)$_2$ were added to the solvent to prepare a saturation solution.

Example 2

5 mL of an alkylammonium salt of a phosphoric ester polymer (DISPERBYK®180 available from BYK-Chemie GmbH) was mixed with 95 mL of PC solvent. 0.05 M of TEABF$_4$ and Ni(bpy)$_3$(BF$_4$)$_2$ were added to the solvent to prepare a saturation solution.

Example 3

An organic electrolyte was prepared in the same manner as in Example 2, except that 3 mL of an alkylammonium salt of a phosphoric ester polymer (DISPERBYK®180 available from BYK-Chemie GmbH) was used instead of the 5 mL of the alkylammonium salt of the phosphoric ester.

Example 4

An organic electrolyte was prepared in the same manner as in Example 2, except that 10 mL of an alkylammonium salt of a phosphoric ester polymer (byk180 available from BYK-Chemie GmbH) was used instead of the 5 mL of the alkylammonium salt of the phosphoric ester.

Example 5

An organic electrolyte was prepared in the same manner as in Example 1, except that 5 mL of an alkylammonium salt of a phosphoric ester-sulfonic acid amine copolymer (DISPERBYK®145 available from BYK-Chemie GmbH) was used instead of the 5 mL of the alkylammonium salt of the phosphoric ester.

Comparative Example 1

An organic electrolyte was prepared in the same manner as in Example 1, except that the alkylammonium salt of the phosphoric ester was not added.

Comparative Example 2

An organic electrolyte was prepared in the same manner as in Example 2, except that the alkylammonium salt of the phosphoric ester-sulfonic acid amine copolymer was not added.

Cyclic Voltammetry

A current as a function of potential was measured for 20 cycles by using the organic electrolytes obtained according to Example 1 and Example 2, at a potential scan rate of 100 millivolts per second (mV/s) and in a potential scan range of about −1.65 volts (V) to about 0.65 V in the case of Fe(bpy)$_3$(BF$_4$)$_2$, and about −1.77 V to about −1.65 V in the case of Ni(bpy)$_3$(BF$_4$)$_2$. A cell for measuring a cyclic voltammogram included an Ag/Ag$^+$ reference electrode, in which 0.3 M of AgNO$_3$ was dissolved in acetonitrile, a carbon felt working electrode, and a platinum counter electrode.

Figure 3A:
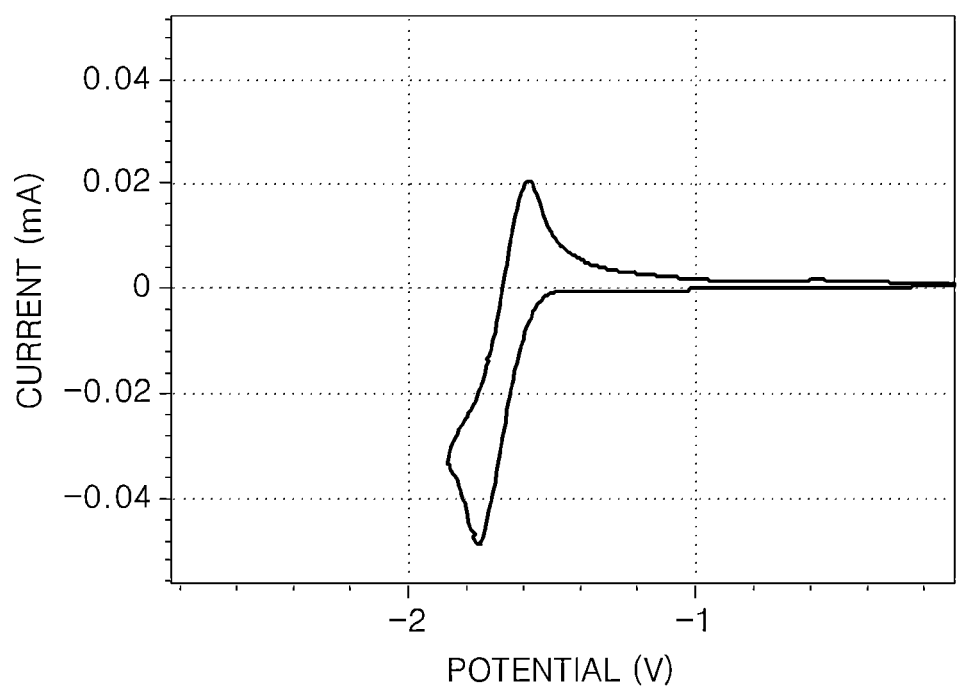
FIGS. 3A and 3B are graphs of current (milliamperes, mA) versus potential (Volts, V) showing results of cyclic voltammetry analysis of Examples 1 and 2.
Figure 3B:
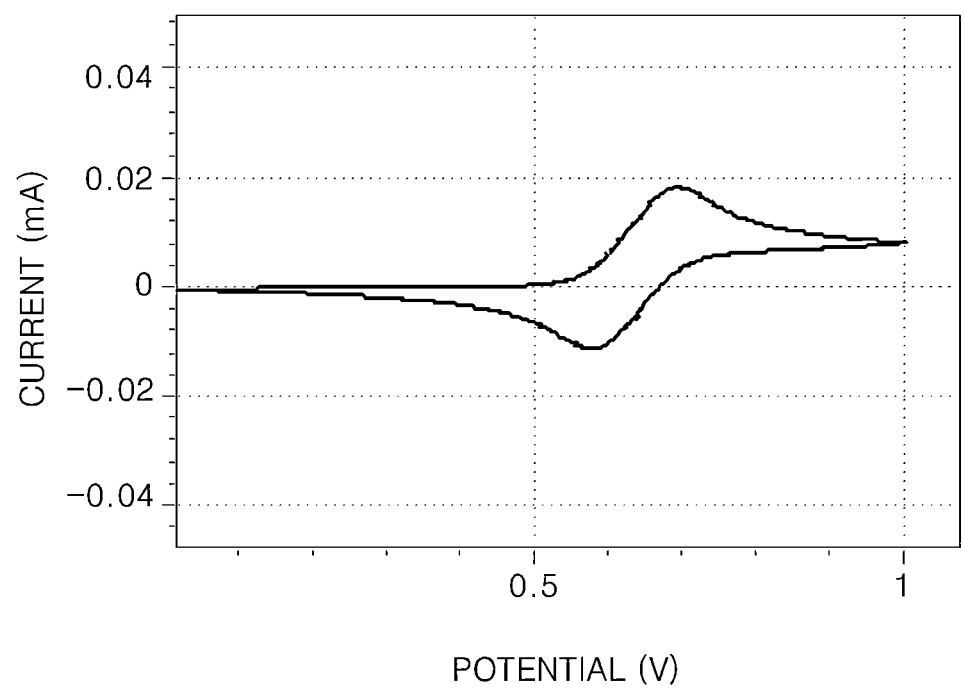

The results of measuring the current values are shown in FIGS. 3A and 3B, respectively corresponding to Examples 1 and 2. As shown in FIGS. 3A and 3B, it may be confirmed that the oxidation-reduction properties of the electrolyte are not affected although the additive is added to the organic electrolyte solution.

Measurement of Solubility of the Metal-Ligand Coordination Compound

Solutions were obtained by filtering the saturated solutions prepared in Comparative Examples 1 and 2 and Examples 1 through 5 and removing impurities from the filtered solution. Inductively coupled plasma (ICP) analysis was performed on the solutions so as to measure the concentration (solubility) of a metal-ligand coordination compound of each of the saturated solutions.

Figure 4:
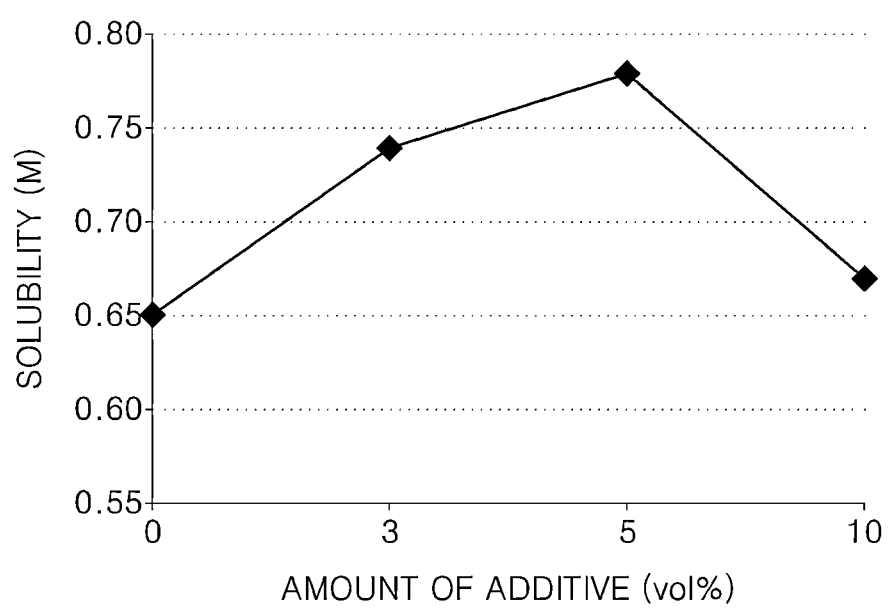
FIG. 4 is a graph of solubility (moles per liter, M) versus amount of additive (volume percent, vol %) showing the solubility of a metal-ligand coordination compound of each of the organic electrolyte solutions of Comparative Example 2 and Examples 2 through 4.

The results of measuring the solubility are shown in Table 1 below and FIG. 4. FIG. 4 is a graph showing the solubility of the metal-ligand coordination compound of each of the organic electrolyte solutions of Comparative Example 2 and Examples 2 through 4 according to the amount of the additives.

In Table 1, the solubility improvement is determined as percentage of Examples 1 and 5 with respect to Comparative Example 1, and Examples 2 to 4 with respect to Comparative Example 2.

TABLE 1

|  | Solubility (M) | Solubility Improvement (%) |
|---|---|---|
| Comparative Example 1 | 0.59 | — |
| Example 1 | 0.73 | 24 |
| Example 5 | 0.73 | 24 |
| Comparative Example 2 | 0.65 | — |
| Example 2 | 0.78 | 20 |
| Example 3 | 0.74 | 14 |
| Example 4 | 0.67 | 3 |

As shown in Table 1 and FIG. 4, it may be confirmed that as an additive is added to an organic electrolyte solution according to an embodiment, the solubility of the metal-ligand coordination compound is increased.

It may be confirmed that, when the solubility of the metal-ligand coordination compound in a solvent is increased, an energy density of a redox flow battery is increased, thereby increasing the performance of the redox flow battery.

As described above, according to an embodiment, an organic electrolyte solution for a redox flow battery having high energy density, and a redox flow battery including the organic electrolyte solution are provided.

It should be understood that the exemplary embodiments described herein should be considered in a descriptive sense only and not for purposes of limitation. Descriptions of features, advantages, or aspects within each embodiment shall be considered as available for other similar features, advantages, or aspects in other embodiments.

What is claimed is:

1. An organic electrolyte solution comprising:
   a solvent;
   an electrolyte comprising a metal-ligand coordination compound; and
   a high-molecular weight additive comprising a metal affinic group, and
   wherein the metal affinic group interacts with the metal of the metal-ligand coordination compound, and comprises at least one selected from an ester group, a carboxyl group, a phosphoric acid group, a sulfonic acid group, a hydroxyl group, and an amine group,
   wherein a hydrogen atom of a backbone of the additive is substituted with a hydrophobic group,
   wherein the backbone of the additive comprises at least one selected from a saturated or unsaturated hydrocarbon, a polyester, a polyurethane, a phosphoric ester polymer, and a phosphoric ester-sulfonic acid amine copolymer, and
   wherein the hydrophobic group is at least one selected from a substituted or unsubstituted C6 to C7 aryl group, and a substituted or unsubstituted C1 to C3 alkyl group.

2. The organic electrolyte solution of claim 1, wherein a metal of the metal-ligand coordination compound comprises at least one selected from nickel (Ni), cobalt (Co), iron (Fe), ruthenium (Ru), zinc (Zn), manganese (Mn), yttrium (Y), zirconium (Zr), titanium (Ti), chromium (Cr), magnesium (Mg), cerium (Ce), copper (Cu), lead (Pb), and vanadium (V).

3. The organic electrolyte solution of claim 1, wherein a ligand of the metal-ligand coordination compound comprises at least one selected from dipyridyl, terpyridyl, ethylene diamine, propylene diamine, phenanthroline, and an N-heterocyclic carbene (NHC).

4. The organic electrolyte solution of claim 3, wherein the N-heterocyclic carbene comprises at least one selected from 2,6-bis(methyl imidazole-2-ylidene)pyridine, 1,3-dimethylimidazole, 1,3-bis(2,5-diisopropyl)imidazole, 1,3-dimethylimidazole, 1,3-di-tert-butylimidazole, 1,3-dicyclohexylimidazole, and 1-ethyl3-methylimidazole.

5. The organic electrolyte solution of claim 1, wherein the metal-ligand coordination compound is reversibly oxidizable or reducible in an oxidation-reduction reaction.

6. The organic electrolyte solution of claim 1, wherein the additive is contained in the organic electrolyte solution in an amount of about 1 to about 15 volume percent, based on a total volume of the organic electrolyte solution.

7. The organic electrolyte solution of claim 1,
   wherein the polymer has a molecular weight of about 10,000 to about 100,000 Daltons.

8. The organic electrolyte solution of claim 1, wherein the additive comprises at least one selected from an alkylolammonium salt of a copolymer having acid groups, an alkylammonium salt of a phosphoric acid ester of a copolymer, a copolymer containing phosphoric acid groups; a copolymer containing carboxylic acid groups; and a polyester containing phosphoric acid groups.

9. The organic electrolyte solution of claim 1, wherein the metal-ligand coordination compound comprises at least one selected from:

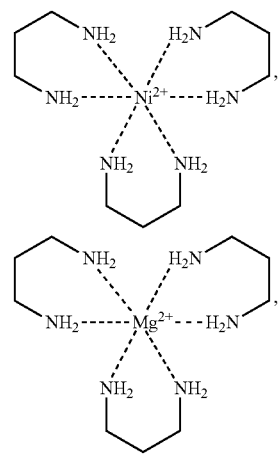

-continued
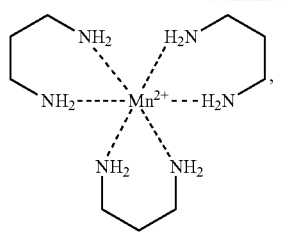
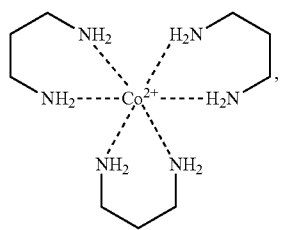
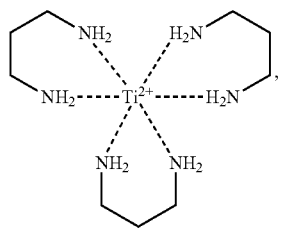
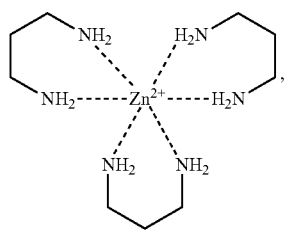
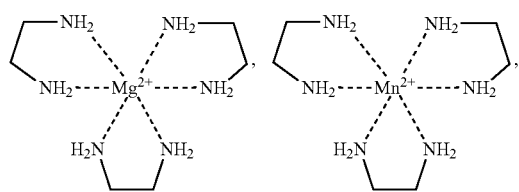
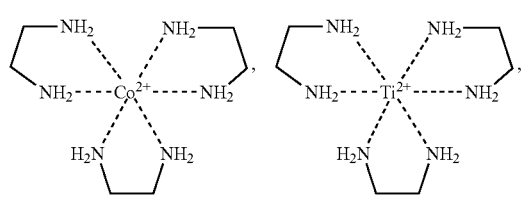
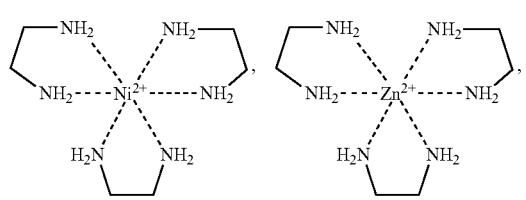
-continued
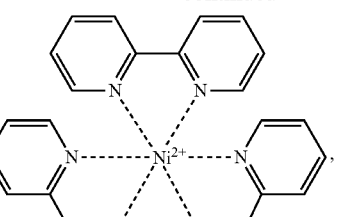
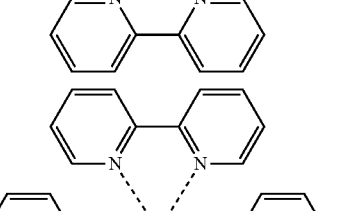
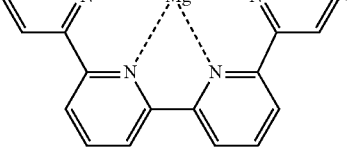
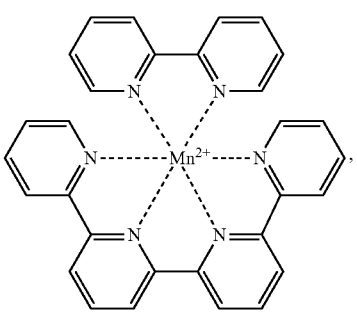
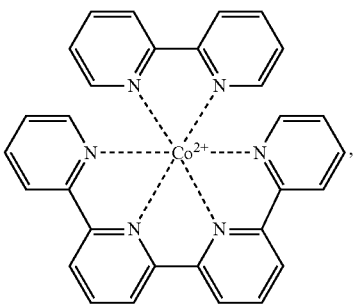
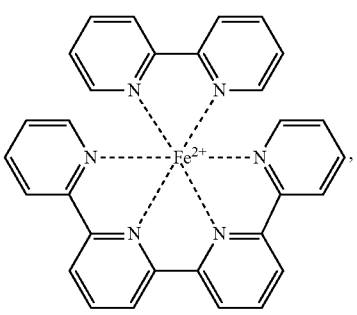

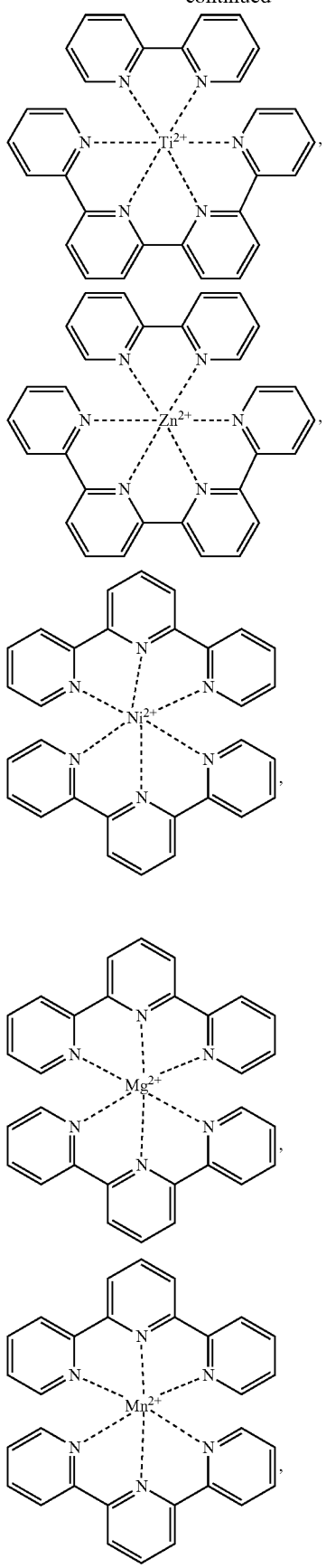
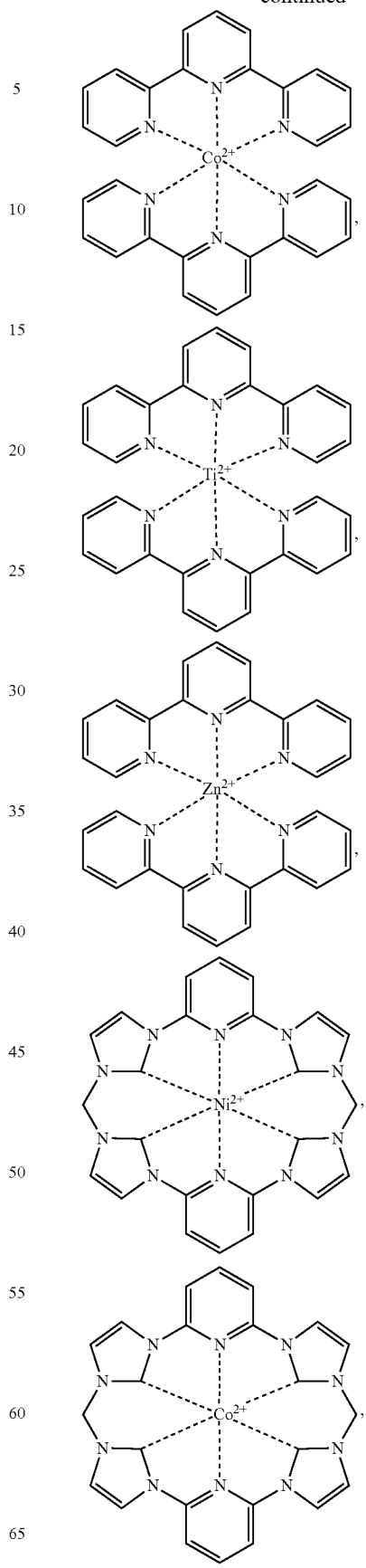

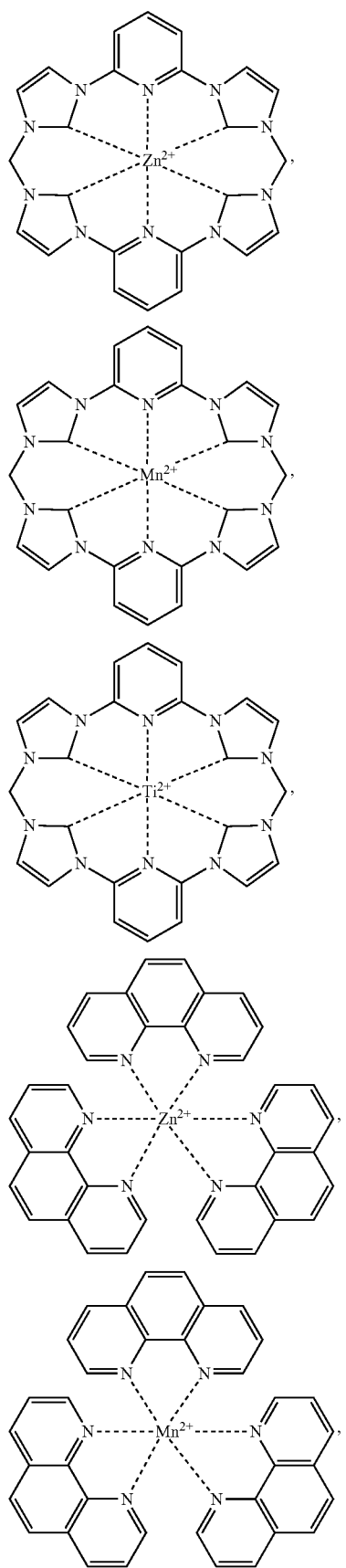
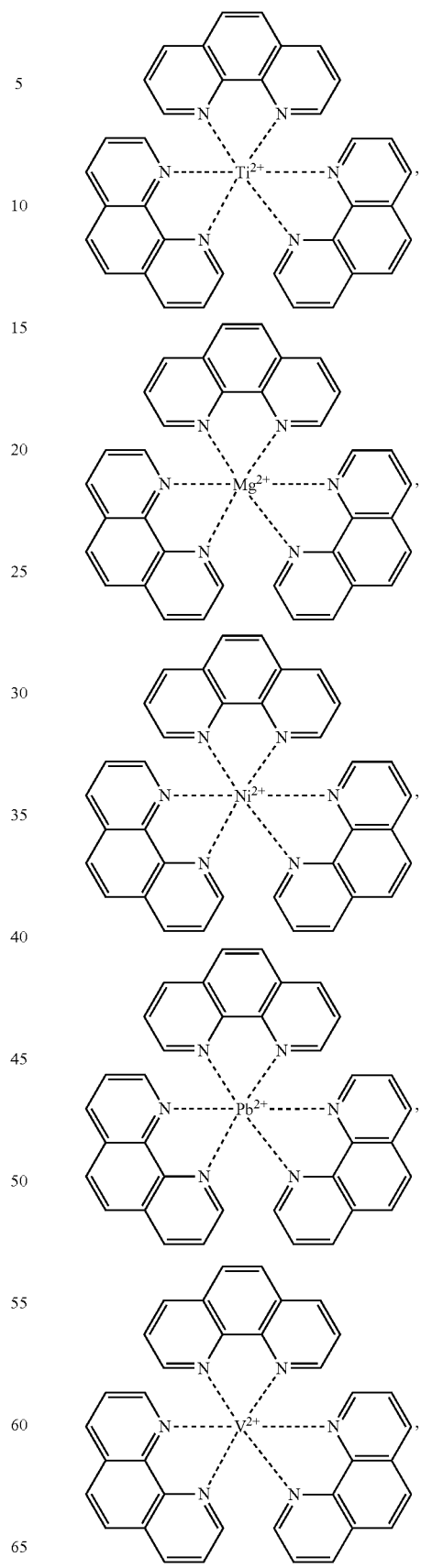

-continued

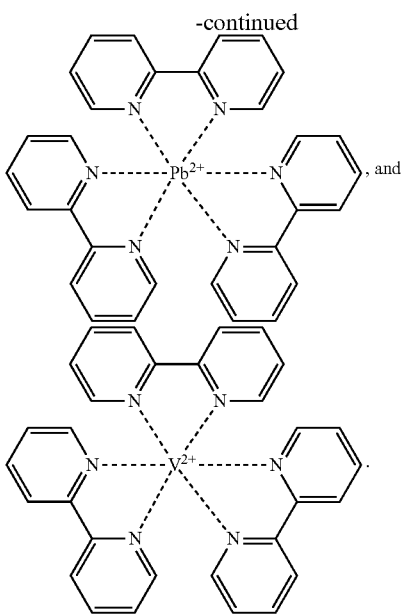

10. The organic electrolyte solution of claim 1, wherein the metal-ligand coordination compound comprises at least one selected from $BF_4^-$, $PF_6^-$, $CF_3SO_3^- ClO_{4r-}$, $(CF_3SO_2)_3C^-$, and $(CF_3SO_2)_2N^-$.

11. The organic electrolyte solution of claim 1, wherein the solvent comprises at least one selected from an aqueous solvent, a non-aqueous solvent, and an ionic liquid.

12. The organic electrolyte solution of claim 11, wherein the non-aqueous solvent is at least one selected from dimethyl acetamide, diethyl carbonate, dimethyl carbonate, acetonitrile, γ-butyrolactone (GBL), propylene carbonate (PC), ethylene carbonate (EC), N-methyl-2-pyrrolidone (NMP), fluoroethylene carbonate, ethyl methyl carbonate, 1,2-dimethoxyethane, 1,2-diethoxyethane, tetrahydrofuran, 2-methyltetrahydrofuran, dioxane, 1,3-dioxolane, diethylene glycol dimethyl ether, ethylene glycol dimethyl ether, and N,N-dimethylacetamide.

13. An electrode for a redox flow battery comprising the organic electrolyte solution of claim 1.

14. A tank comprising the organic electrolyte solution of claim 1.

15. A redox flow battery comprising:
a cathode cell comprising a cathode and a catholyte;
an anode cell comprising an anode and an anolyte; and
an ion exchange membrane disposed between the cathode cell and the anode cell,
wherein at least one of the catholyte and the anolyte comprises the organic electrolyte solution of claim 1.

16. The redox flow battery of claim 15, wherein the catholyte and the anolyte comprise a redox couple of $Fe^{2+}/Ni^0$ or $Ru^{2+}/Ni^0$.

17. The redox flow battery of claim 15, further comprising a catholyte tank and an anolyte tank in fluid communication with the cathode cell and the anode cell, respectively.

18. A method of manufacturing an organic electrolyte solution for a redox flow battery, the method comprising:
contacting a solvent, an electrolyte comprising a metal-ligand coordination compound; and a high-molecular weight additive comprising a metal affinic group to manufacture the organic electrolyte solution of claim 1.

19. The method of claim 18, wherein the additive comprises a polymer having a backbone selected from at least one selected from a saturated or unsaturated hydrocarbon, a polyester, a polyurethane, a phosphoric ester polymer, and a phosphoric ester-sulfonic acid amine copolymer, and
wherein the polymer has a molecular weight of about 10,000 to about 100,000 Daltons.

20. The method of claim 19, wherein a hydrogen atom of a backbone of the additive is substituted with the hydrophobic group, wherein the hydrophobic group is at least one selected from a substituted or unsubstituted $C_6$ to $C_7$ aryl group, and a substituted or unsubstituted $C_1$ to $C_3$ alkyl group.

* * * * *